United States Patent
Xie et al.

(10) Patent No.: US 11,876,451 B2
(45) Date of Patent: Jan. 16, 2024

(54) DC-DC CONVERTER

(71) Applicant: HUAWEI TECHNOLOGIES CO., LTD., Guangdong (CN)

(72) Inventors: Qiang Xie, Shenzhen (CN); Liang Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 335 days.

(21) Appl. No.: 17/366,405

(22) Filed: Jul. 2, 2021

(65) Prior Publication Data

US 2021/0336541 A1 Oct. 28, 2021

Related U.S. Application Data

(63) Continuation of application No. PCT/CN2019/070392, filed on Jan. 4, 2019.

(51) Int. Cl.
   *H02M 3/158* (2006.01)
   *H02M 1/00* (2006.01)
   *H02M 3/07* (2006.01)

(52) U.S. Cl.
   CPC .......... *H02M 3/158* (2013.01); *H02M 1/0083* (2021.05); *H02M 3/07* (2013.01)

(58) Field of Classification Search
   CPC ....... H02M 3/158; H02M 1/0083; H02M 3/07
   See application file for complete search history.

(56) References Cited

U.S. PATENT DOCUMENTS

| 10,084,384 | B1  | 9/2018  | Kotikalapoodi |         |
|------------|-----|---------|---------------|---------|
| 2008/0239772 | A1 | 10/2008 | Oraw et al.   |         |
| 2014/0184189 | A1 | 7/2014  | Salem         |         |
| 2016/0344214 | A1 | 11/2016 | Petersen et al. |       |
| 2017/0279354 | A1 | 9/2017  | Lueders et al. |        |
| 2023/0029565 | A1* | 2/2023 | Yu            | H02M 1/14 |

FOREIGN PATENT DOCUMENTS

| CN | 101860206 A | 10/2010 |
| CN | 104506036 A | 4/2015  |
| CN | 105556820 A | 5/2016  |
| CN | 106026643 A | 10/2016 |

(Continued)

OTHER PUBLICATIONS

Extended European Search Report issued in European Application No. 19907291.9 dated Oct. 29, 2021, 8 pages.

(Continued)

*Primary Examiner* — Adolf D Berhane
(74) *Attorney, Agent, or Firm* — Fish & Richardson P.C.

(57) ABSTRACT

The present disclosure discloses example DC-DC converters. One example DC-DC converter includes a first capacitor, a second capacitor, a switched capacitor SC circuit, and an inductor circuit. An input end of the SC circuit is coupled to a voltage input end, and an output end of the SC circuit is coupled to a voltage output end. The first capacitor and the second capacitor are sequentially connected in series between the voltage input end and the voltage output end. One end of the inductor circuit is selectively coupled between the first capacitor and the second capacitor or to a ground end, and the other end of the inductor circuit is coupled to the voltage output end.

12 Claims, 7 Drawing Sheets

(56) References Cited

FOREIGN PATENT DOCUMENTS

| | | |
|---|---|---|
| CN | 106787736 A | 5/2017 |
| JP | 2002027742 A | 1/2002 |
| WO | 2017156638 A1 | 9/2017 |

OTHER PUBLICATIONS

Li et al., "An AC-coupled stacked dual active bridge hybrid DC-DC converter for battery-to-processor power delivery with 87.2% peak efficiency and high accuracy loadline regulation," IEEE Journal of Solid-State Circuits, Dec. 19, 2018, 4 pages.
EP Communication Pursuant to Article 94(3) EPC in European Appln. No. 19907291.9, dated Feb. 21, 2023, 5 pages.
Office Action issued in Chinese Application No. 201980086942.7 dated Mar. 24, 2022, 13 pages (with English translation).
PCT International Search Report and Written Opinion in International Application No. PCT/CN2019/070392, dated Sep. 19, 2019, 17 pages.

\* cited by examiner

DC-DC CONVERTER

CROSS-REFERENCE TO RELATED APPLICATIONS

This application is a continuation of International Application No. PCT/CN2019/070392, filed on Jan. 4, 2019, the disclosure of which is hereby incorporated by reference in its entirety.

TECHNICAL FIELD

Embodiments of this application relate to direct current-direct current technologies, and in particular, to a DC-DC converter.

BACKGROUND

Currently, many electronic devices need to keep working by using a power supply. In an electronic device using a direct current source, a voltage converter needs to be used to convert voltage of the power supply to required working voltage. A direct current-direct current (DC-DC) converter is a common voltage converter.

Based on a topology structure of the DC-DC converter, the DC-DC converter may implement buck, boost, buck-boost, and the like. DC-DC converters that can implement a buck function include a buck converter implemented by using an inductor, an SC converter implemented by using a switched capacitor (SC), and a three-order hybrid converter implemented by using an inductor and a capacitor.

The DC-DC converters described above have poor voltage conversion efficiency and poor transient performance.

SUMMARY

Embodiments of this application provide a direct current-direct current DC-DC converter, to improve transient performance while providing voltage conversion efficiency.

According to a first aspect, an embodiment of this application provides a DC-DC converter. The DC-DC converter is configured to receive input voltage from a voltage input end, and output voltage to a voltage output end. The DC-DC converter includes a first capacitor, a second capacitor, a switched capacitor SC circuit, and an inductor circuit. An input end of the SC circuit is coupled to the voltage input end, and an output end of the SC circuit is coupled to the voltage output end. The first capacitor and the second capacitor are sequentially connected in series between the voltage input end and the voltage output end. One end of the inductor circuit is selectively coupled between the first capacitor and the second capacitor or to a ground end, and the other end of the inductor circuit is coupled to the voltage output end. In a working process of the DC-DC converter provided in this embodiment, the SC circuit works in an open-loop mode, and voltage conversion efficiency is relatively high. In addition, the output voltage at the voltage output end is adjusted by a buck structure implemented by using the inductor circuit, so that transient performance of the DC-DC converter can be ensured. Generally, the DC-DC converter has high voltage conversion efficiency and good transient performance.

In a feasible design, the SC circuit includes a third capacitor and a fourth capacitor. One end of the third capacitor is selectively coupled to the voltage input end or the voltage output end, and the other end of the third capacitor is selectively coupled to the voltage output end or the ground end. One end of the fourth capacitor is selectively coupled to the voltage input end or the voltage output end, and the other end of the fourth capacitor is selectively coupled between the first capacitor and the second capacitor or to the ground end. The DC-DC converter provided in this embodiment has high voltage conversion efficiency and good transient performance.

In a feasible design, the SC circuit further includes a first switch, a second switch, a third switch, a fourth switch, a fifth switch, a sixth switch, and a seventh switch. A first end of the first switch is coupled to the ground end, a first end of the second switch is coupled to the voltage output end, a second end of the first switch is coupled to a first end of the third capacitor, and a second end of the second switch is coupled to the first end of the third capacitor. A first end of the third switch is coupled to the ground end, a first end of the fourth switch is coupled to a second end of the first capacitor, a second end of the third switch is coupled to a first end of the fourth capacitor, and a second end of the fourth switch is coupled to the first end of the fourth capacitor. A second end of the third capacitor is coupled to a first end of the fifth switch, a second end of the fifth switch is coupled to the voltage output end, a second end of the fourth capacitor is coupled to a first end of the sixth switch, and a second end of the sixth switch is coupled to the first end of the fifth switch. A first end of the seventh switch is coupled to the voltage input end, and a second end of the seventh switch is coupled to the second end of the fourth capacitor. A first end of the first capacitor is coupled to the voltage input end, the second end of the first capacitor is coupled to a first end of the second capacitor, and a second end of the second capacitor is coupled to the ground end. When the first switch, the fourth switch, the fifth switch, and the seventh switch are turned on, and the second switch, the third switch, and the sixth switch are turned off, the third capacitor discharges energy, and the fourth capacitor stores energy. When the first switch, the fourth switch, the fifth switch, and the seventh switch are turned off, and the second switch, the third switch, and the sixth switch are turned on, the third capacitor stores energy, and the fourth capacitor discharges energy. In this embodiment, the SC circuit is implemented by using a 2:1 SC circuit, and the DC-DC converter is further obtained based on the SC circuit and the inductor circuit, so as to implement a DC-DC converter that improves transient performance while improving voltage conversion efficiency.

In a feasible design, the inductor circuit includes an eighth switch, a ninth switch, and an inductor. A first end of the eighth switch is coupled to the first end of the second capacitor, a second end of the eighth switch is coupled to a first end of the ninth switch, a second end of the ninth switch is coupled to the ground end, a first end of the inductor is coupled to the first end of the ninth switch, and a second end of the inductor is coupled to the voltage output end. In this embodiment, the output voltage at the voltage output end of the DC-DC converter is adjusted by using the inductor circuit, so as to implement a DC-DC converter that improves transient performance while improving voltage conversion efficiency.

In a feasible design, when the output voltage at the voltage output end is lower than target voltage, on duration of the eighth switch is prolonged, so that the SC circuit reaches a stable state. When the output voltage at the voltage output end is higher than the target voltage, on duration of the ninth switch is prolonged, so that the SC circuit reaches a stable state. When the SC circuit reaches a stable state, voltage between the two ends of the first capacitor is twice the output voltage at the voltage output end, and voltage between the two ends of the second capacitor is a difference between the input voltage and the voltage between the two ends of the first capacitor. In this embodiment, the on duration of the eighth switch and that of the ninth switch in the inductor circuit are adjusted, so as to adjust the output voltage at the voltage output end of the DC-DC converter.

According to a second aspect, an embodiment of this application provides a direct current-direct current DC-DC converter, configured to receive input voltage from a voltage input end, and output voltage to a voltage output end. The DC-DC converter includes a switched capacitor SC circuit and an inductor. An input end of the SC circuit is coupled to the voltage input end. Output ends of the SC circuit include a first output end and a second output end. The first output end is coupled to the voltage output end, the second output end is coupled to one end of the inductor, and the other end of the inductor is coupled to the output end. A capacitor included in the SC circuit is selectively adjusted to be connected in parallel or in series to the inductor. In a working process of the DC-DC converter provided in this embodiment, when the SC circuit is in an energy storage state or an energy discharging state, the SC circuit and the inductor are connected in parallel. When the SC circuit and the inductor are connected in parallel, because the SC circuit is configured to improve voltage conversion efficiency, and the inductor is configured to improve transient performance, conversion efficiency of the DC-DC converter is equal to the sum of conversion efficiency of the SC circuit and conversion efficiency of the inductor, instead of conversion efficiency of a conventional hybrid DC-DC converter that is equal to a product of the conversion efficiency of the SC circuit and the conversion efficiency of the inductor. Therefore, the DC-DC converter provided in this embodiment of this application can improve voltage conversion efficiency.

In a feasible design, the capacitor included in the SC circuit is a fifth capacitor, and the SC circuit further includes a tenth switch, an eleventh switch, and a twelfth switch. A first end of the tenth switch is coupled to the voltage input end, a second end of the tenth switch is coupled to a first end of the fifth capacitor, a second end of the fifth capacitor is coupled to a first end of the eleventh switch, a second end of the eleventh switch is coupled to a ground end, the first end of the eleventh switch is coupled to a first end of the twelfth switch, a second end of the twelfth switch is coupled to the voltage output end, the first end of the fifth capacitor is coupled to a first end of the inductor, and a second end of the inductor is coupled to the voltage output end. In this embodiment, because the SC circuit is an open-loop SC architecture, a switch voltage drop of the SC circuit is smaller than that of a power supply, and conversion efficiency of the entire SC is relatively high. In addition, the SC works in an open-loop state, and voltage drops at the two ends of the inductor L are relatively small, so that a magnetic loss of the inductor L is relatively small. Therefore, conversion efficiency of the DC-DC converter is relatively high overall.

In a feasible design, when the tenth switch and the twelfth switch are turned on, and the eleventh switch is turned off, the SC circuit is in an energy storage state, and the fifth capacitor and the inductor are connected in parallel. When the tenth switch and the twelfth switch are turned off, and the eleventh switch is turned on, the SC circuit is in an energy discharging state, and the fifth capacitor and the inductor are connected in series. In this embodiment, the DC-DC converter provided in this embodiment of this application can improve voltage conversion efficiency and improve transient performance.

In a feasible design, when the output voltage at the voltage output end is lower than target voltage, on duration of the tenth switch and on duration of the twelfth switch are prolonged, so that the SC circuit reaches a stable state. When the output voltage at the voltage output end is higher than the voltage, on duration of the eleventh switch is prolonged, so that the SC circuit reaches a stable state. When the SC circuit reaches a stable state, voltage between the two ends of the fifth capacitor is the same as the output voltage at the voltage output end. In this embodiment, the on duration of the switch in the DCDC circuit is adjusted, so as to adjust the output voltage at the voltage output end of the DC-DC converter.

In a feasible design, the capacitor included in the SC circuit is a sixth capacitor, and the SC circuit further includes a thirteenth switch, a fourteenth switch, and a fifteenth switch. A first end of the thirteenth switch is coupled to the voltage input end, a second end of the thirteenth switch is coupled to a first end of the sixth capacitor, a second end of the sixth capacitor is coupled to a first end of the fourteenth switch, a second end of the fourteenth switch is coupled to a ground end, the first end of the sixth capacitor is coupled to a first end of the fifteenth switch, a second end of the fifteenth switch is coupled to the voltage output end, the second end of the sixth capacitor is coupled to a first end of the inductor, and a second end of the inductor is coupled to the voltage output end. According to the DC-DC converter provided in this embodiment, in a working process of the DC-DC converter, because the SC circuit works in an open-loop mode, a switch voltage drop of the SC circuit is smaller than that of a power supply, and conversion efficiency of the entire SC is relatively high. In addition, the SC works in an open-loop state, and voltage drops at the two ends of the inductor L are relatively small, so that a magnetic loss of the inductor L is relatively small. Therefore, conversion efficiency of the DC-DC converter is relatively high overall.

In a feasible design, when the thirteenth switch is turned on, and the fourteenth switch and the fifteenth switch are turned off, the SC circuit is in an energy storage state, and the sixth capacitor and the inductor are connected in series. When the thirteenth switch is turned off, and the fourteenth switch and the fifteenth switch are turned on, the SC circuit is in an energy discharging state, and the sixth capacitor and the inductor are connected in parallel. In this embodiment, when the SC circuit and the inductor are connected in parallel, because the SC circuit is configured to improve voltage conversion efficiency, and the inductor is configured to improve transient performance, conversion efficiency is equal to the sum of conversion efficiency of the SC circuit and conversion efficiency of the inductor, instead of a product of the conversion efficiency of the SC circuit and the conversion efficiency of the inductor. Therefore, the DC-DC converter provided in this embodiment of this application can improve voltage conversion efficiency and can improve transient performance.

In a feasible design, when the output voltage al the voltage output end is lower than target voltage, on duration of the thirteenth switch is prolonged, so that the SC circuit reaches a stable state. When the output voltage at the voltage output end is higher than the voltage, on duration of the fourteenth switch and on duration of the fifteenth switch are prolonged, so that the SC circuit reaches a stable state. When the SC circuit reaches a stable state, voltage between the two ends of the sixth capacitor is the same as the output voltage at the voltage output end. In this embodiment, the on duration of the switch in the DCDC circuit is adjusted, so as to adjust the output voltage at the voltage output end of the DC-DC converter.

The DC-DC converter provided in the embodiments of this application includes the first capacitor, the second capacitor, the switched capacitor SC circuit, and the inductor circuit. The input end of the SC circuit is coupled to the voltage input end, and the output end of the SC circuit is coupled to the voltage output end. The first capacitor and the second capacitor are sequentially connected in series between the voltage input end and the voltage output end. One end of the inductor circuit is selectively coupled between the first capacitor and the second capacitor or to the ground end, and the other end of the inductor circuit is coupled to the voltage output end. In a working process, the SC circuit works in an open-loop mode, and voltage conversion efficiency is relatively high. In addition, the output voltage at the voltage output end is adjusted by a buck structure implemented by using the inductor circuit, so that transient performance of the DC-DC converter can be ensured. Generally, the DC-DC converter has high voltage conversion efficiency and good transient performance.

DESCRIPTION OF EMBODIMENTS

Currently, conventional DC-DC converters that can implement a buck function include a buck converter implemented by using an inductor, an SC converter implemented by using a capacitor, and a three-order hybrid (hybrid) converter implemented by using an inductor and a capacitor. The three converters are separately described below in detail. For example, reference may be made to FIG. 1A, FIG. 1B, FIG. 1C, and FIG. 1D.

Figure 1A:
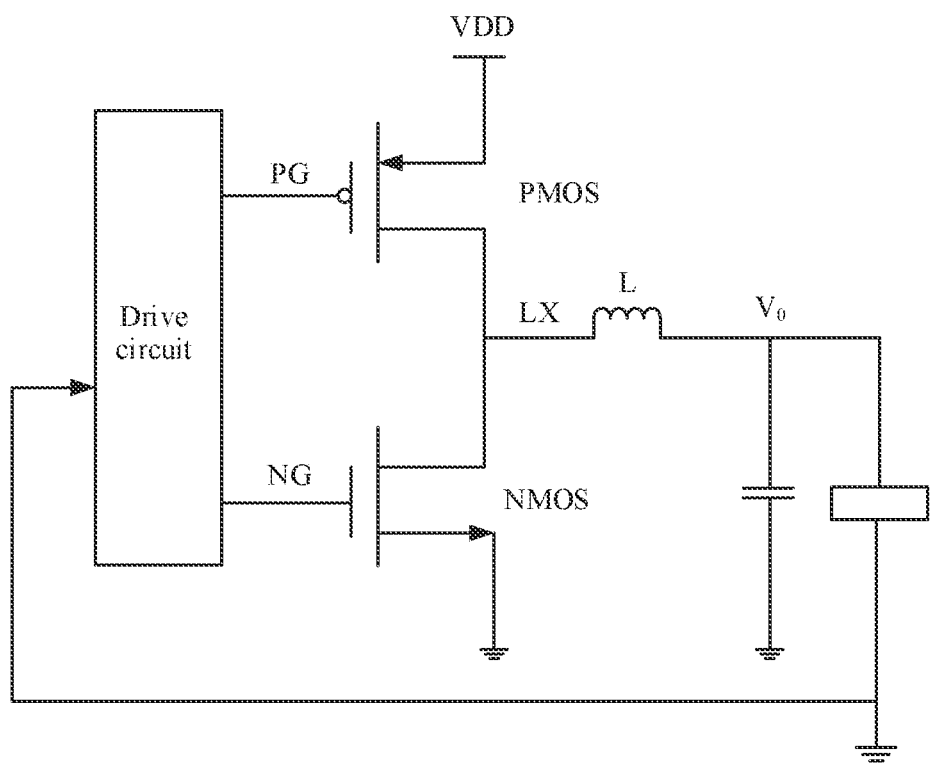
FIG. 1A is a circuit of a buck converter implemented by using an inductor.

FIG. 1A is a circuit of a buck converter implemented by using an inductor. Referring to FIG. 1A, a P-type metal-oxide semiconductor (p-type metal-oxide semiconductor, PMOS) and an N-type metal-oxide semiconductor (n-type metal-oxide semiconductor, NMOS) form a switch element, and input voltage VDD is connected to the PMOS. The PMOS and the NMOS are alternately turned on and turned off under driving of a PG signal and an NG signal provided by a drive circuit. An alternating-current signal that is output at an output node LX is used to enable an inductor L to store energy, so as to provide direct-current output voltage VO to two ends of a capacitor. A load resistor connected to the output end is connected to the drive circuit to form a closed-loop feedback, and consequently the inductor has a magnetic loss.

Figure 1B:
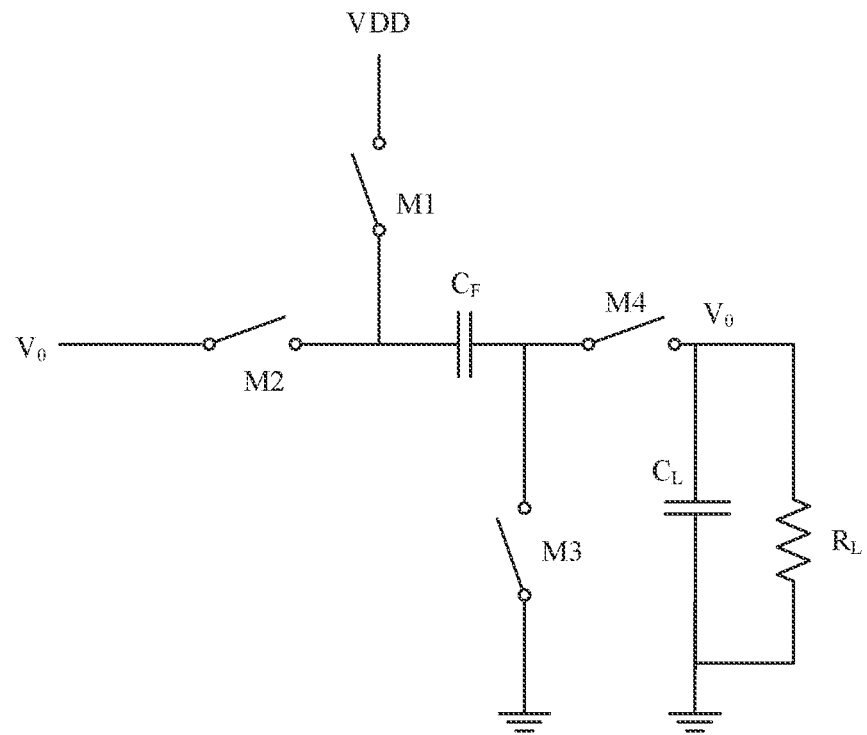
FIG. 1B is an SC converter implemented by using a capacitor.

FIG. 1B is an SC converter implemented by using a capacitor. Referring to FIG. 1B, in a first half period, a switch M1 and a switch M4 are turned on, a switch M2 and a switch M3 are turned off, and input voltage VDD directly charges a fly capacitor $C_F$ and an output capacitor $C_L$. In a latter half period, the switch M1 and the switch M4 are turned off, the switch M2 and the switch M3 are turned on, the fly capacitor $C_F$ and the output capacitor $C_L$ are connected in parallel, and the fly capacitor $C_F$ discharges electricity to the output capacitor $C_L$. The SC converter works in an open-loop state, and voltage between two ends of the non-capacitor $C_F$ is VO. VO is about half of the input voltage VDD. If the SC converter works in a closed-loop state, it is difficult to improve overall conversion efficiency because a conductive impedance of a switch tube in a channel needs to be adjusted. Therefore, the SC converter usually works in an open-loop state, and theoretical conversion efficiency may be close to 100%, but overall transient performance is relatively poor because there is no loop adjustment feature.

Figure 1C:
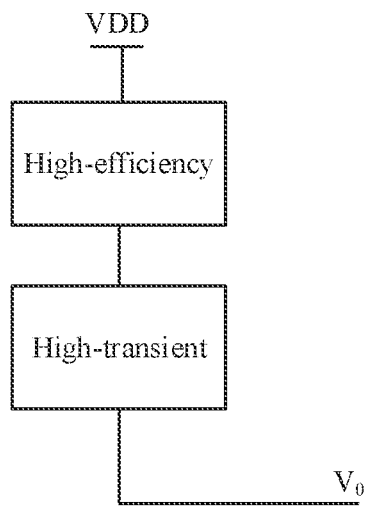
FIG. 1C is a schematic module diagram of a hybrid converter.
Figure 1D:
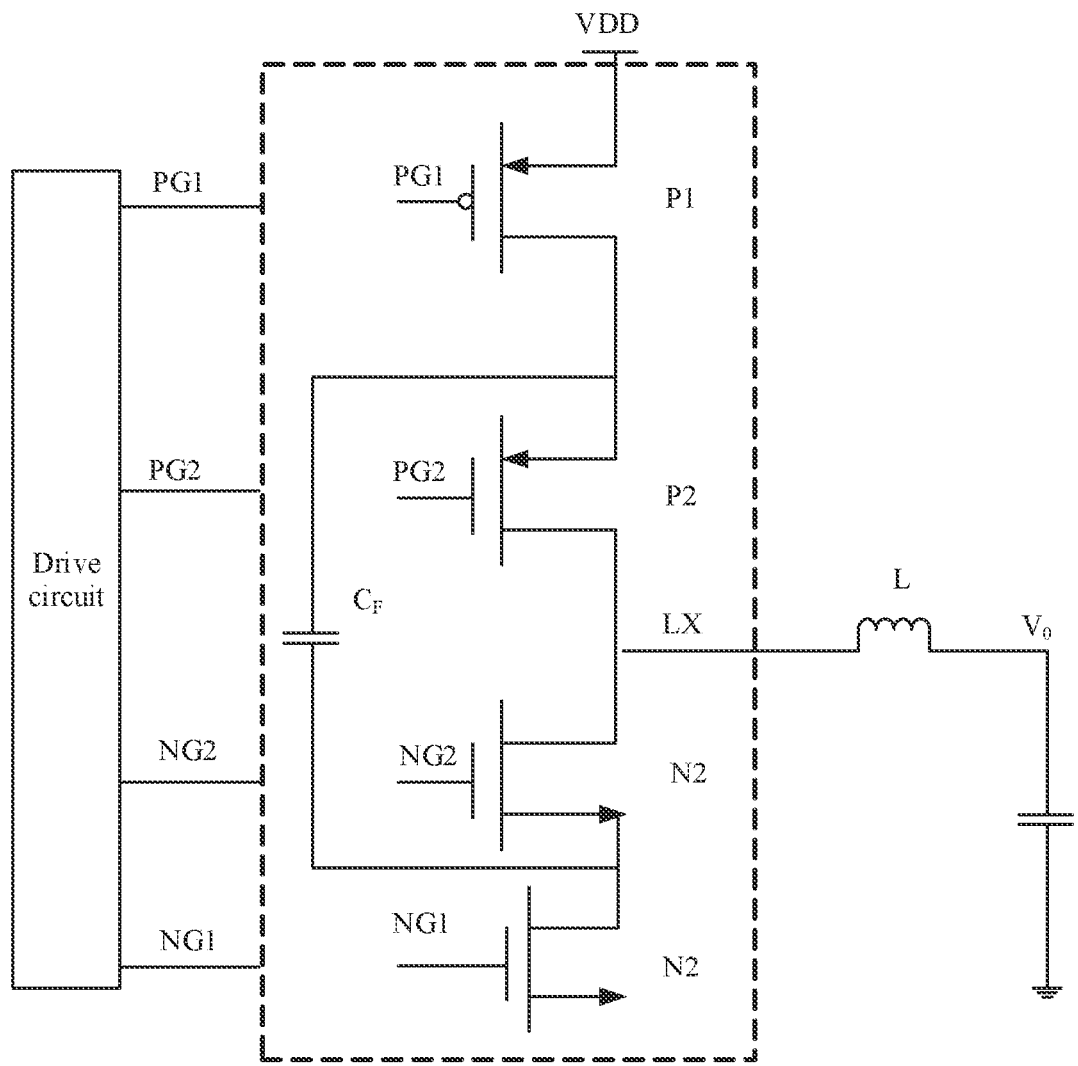
FIG. 1D is a circuit diagram of a hybrid converter.

FIG. 1C is a schematic module diagram of a hybrid converter, and FIG. 1D is a circuit of a hybrid converter. Referring to FIG. 1C, the hybrid converter includes a high-efficiency SC architecture implemented by using a capacitor and a buck structure implemented by using an inductor, and the SC architecture and the buck architecture are connected in series. Referring to FIG. 1D, the hybrid converter includes two PMOSs and two NMOSs, which are respectively P1, P2, N1, and N2 shown in the figure. A drive circuit is configured to provide a PG1, a PG2, an NG1, and an NG2, which are respectively used to control P1, P2, N1, and N2 to be turned on and turned off. The PG1 is connected to input voltage VDD. In a ¼ period, P1 and N2 are turned on, and P2 and N1 are turned off, VDD supplies power to an output end by using a fly capacitor $C_F$ and an inductor L. In a 2/4 period, N1 and N2 are turned on, P1 and P2 are turned off, and power is supplied to the output end by using the ground and the inductor L. In a ¾ period, P1 and N2 are turned off, P2 and N1 are turned on, and the fly capacitor $C_F$ supplies power to the output end by using the inductor L. In a 4/4 period, N1 and N2 are turned on, P1 and P2 are turned off, and energy is provided to the output end by using the ground and the inductor L. In a stable working state, voltage between two ends of the fly capacitor $C_F$ is half the input voltage VDD. In this hybrid converter, a high-efficiency capacitor is used to implement the SC architecture which is connect to the buck structure through a high transient inductor. In both an energy storage process and an energy discharging process, the high-efficiency SC architecture and the high-transient buck architecture are connected in series. Therefore, efficiency of the hybrid converter is a product of efficiency of the SC architecture and efficiency of the buck architecture.

It is found through verification that the DC-DC converters described above have poor voltage conversion efficiency and poor transient performance.

In view of this, embodiments of this application provide a direct current-direct current DC-DC converter, to improve transient performance while providing voltage conversion efficiency.

Figure 2:
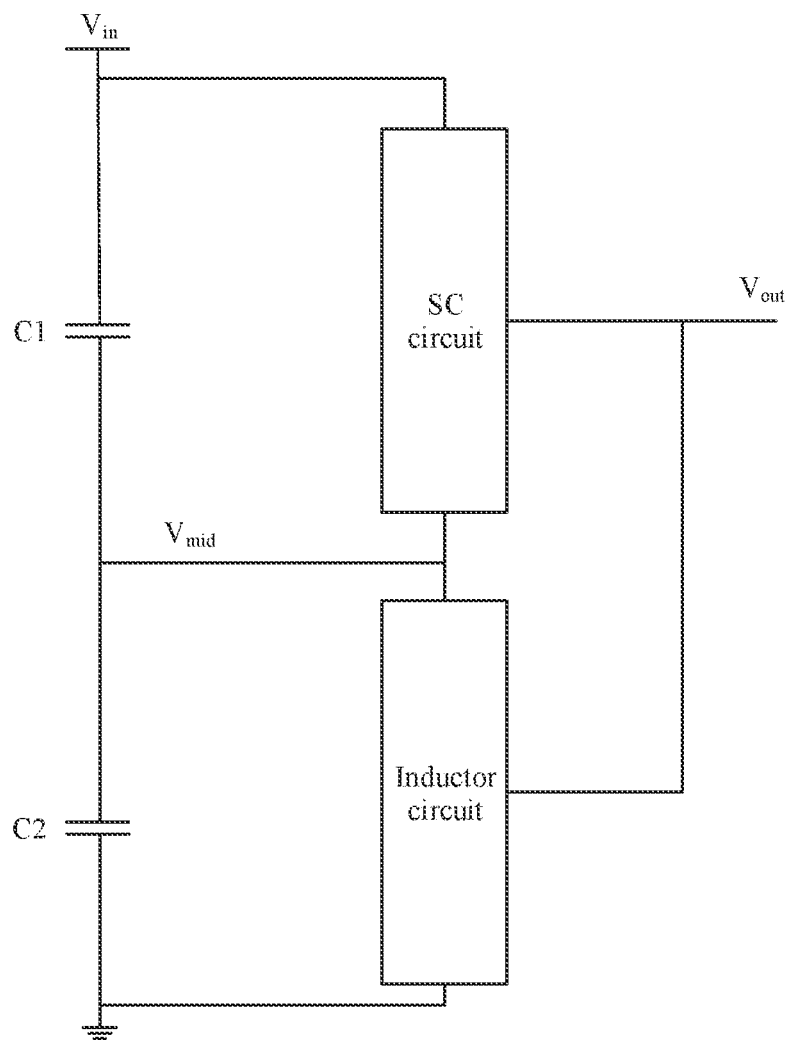
FIG. 2 is a schematic structural diagram of a DC-DC converter according to an embodiment of this application.

FIG. 2 is a schematic structural diagram of a DC-DC converter according to an embodiment of this application. Referring to FIG. 2, the DC-DC converter provided in this embodiment of this application is configured to receive input voltage from a voltage input end, and output voltage to a voltage output end. The DC-DC converter includes a first capacitor C1, a second capacitor C2, an SC circuit, and an inductor circuit. An input end of the SC circuit is coupled to the voltage input end, and an output end of the SC circuit is coupled to the voltage output end. The first capacitor C1 and the second capacitor C2 are sequentially connected in series between the voltage input end and a ground end. One end of the inductor circuit is selectively coupled between the first capacitor and the second capacitor or to the ground end, and the other end of the inductor circuit is coupled to the voltage output end.

It may be learned based on FIG. 2 that input voltage of the SC and input voltage of the inductor circuit are connected in series and are coupled to the voltage input end, that is, the input voltage of the SC circuit and that of the inductor are connected in series to the voltage input end. However, outputs of the SC circuit and the inductor circuit are connected together and are coupled to the voltage output end, that is, the outputs of the SC circuit and the inductor circuit are output in parallel. When one end of the inductor circuit is coupled between the first capacitor C1 and the second capacitor C2. Vmid is an input power supply of the inductor circuit. The SC circuit may be a 2:1 SC circuit, a 3:1 SC circuit, a 4:1 SC circuit, a 5:2 SC circuit, or a buck SC circuit of any ratio.

Referring to FIG. 2, in a working process, the SC circuit works in an open-loop mode, and the inductor circuit including an inductor works in a closed-loop mode. When the output voltage Vout at the voltage output end is lower than or higher than target voltage, the inductor circuit is adjusted so that voltage V1 between two ends of the first capacitor C1 meets V1=Vout×2, and voltage V2 between two ends of the second capacitor C2 meets V2=Vin−2×Vout. In this case, the circuit reaches a stable working state.

The DC-DC converter provided in this embodiment of this application includes the first capacitor, the second capacitor, the switched capacitor SC circuit, and the inductor circuit. The input end of the SC circuit is coupled to the voltage input end, and the output end of the SC circuit is coupled to the voltage output end. The first capacitor and the second capacitor are sequentially connected in series between the voltage input end and the voltage output end. One end of the inductor circuit is selectively coupled between the first capacitor and the second capacitor or to the ground end, and the other end of the inductor circuit is coupled to the voltage output end. In a working process, the SC circuit works in an open-loop mode, and voltage conversion efficiency is relatively high. In addition, the output voltage at the voltage output end is adjusted by a buck structure implemented by using the inductor circuit, so that transient performance of the DC-DC converter can be ensured. Generally, the DC-DC converter has high voltage conversion efficiency and good transient performance.

In a feasible implementation, the SC circuit includes a third capacitor C3 and a fourth capacitor C4. One end of the third capacitor is selectively coupled to the voltage input end or the voltage output end, and the other end of the third capacitor C3 is selectively coupled to the voltage output end or the ground end. One end of the fourth capacitor C4 is selectively coupled to the voltage input end or the voltage output end, and the other end of the fourth capacitor C4 is selectively coupled between the first capacitor C1 and the second capacitor C2 or to the ground end.

The DC-DC converter is described below in detail by using an example in which the SC circuit is a 2:1 SC circuit. For example, referring to FIG. 3, FIG. 3 is a circuit diagram of another DC-DC converter according to an embodiment of this application.

Figure 3:
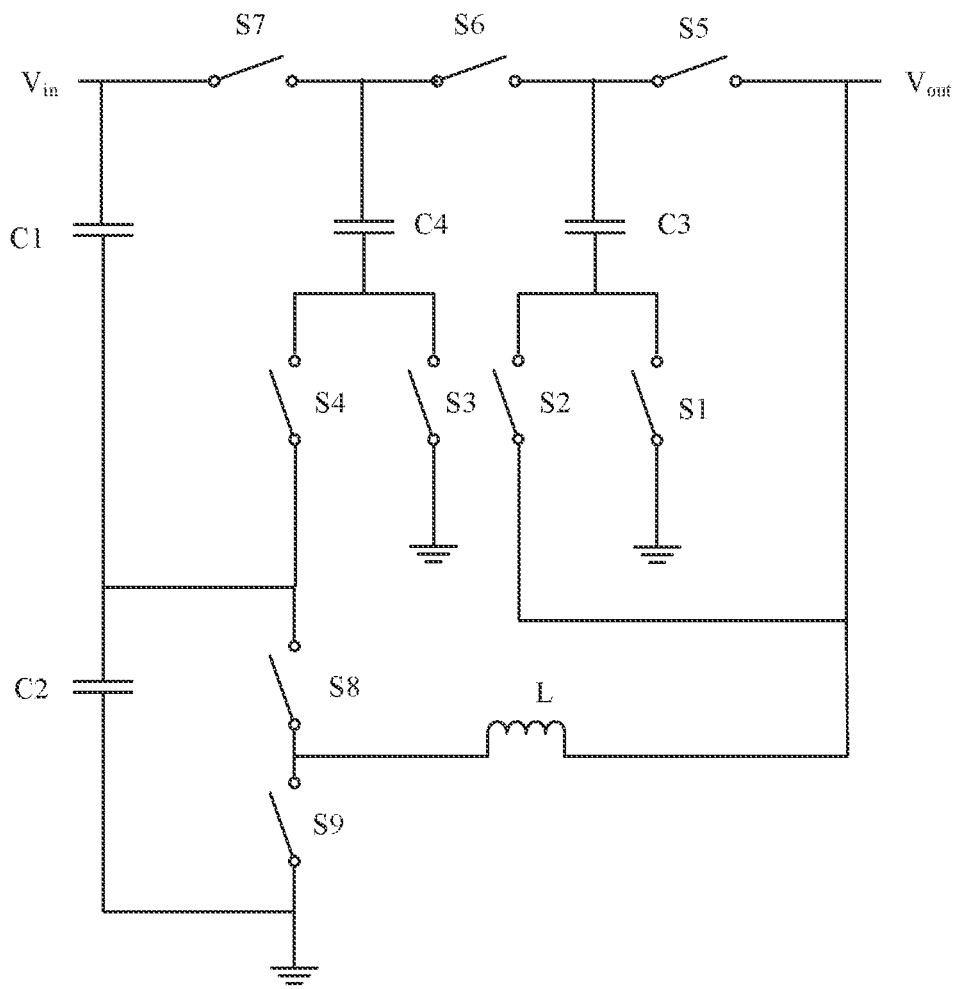
FIG. 3 is a circuit diagram of another DC-DC converter according to an embodiment of this application.

Referring to FIG. 3, the SC circuit includes a first switch S1, a second switch S2, a third switch S3, a fourth switch S4, a fifth switch S5, a sixth switch S6, a seventh switch S7, a third capacitor C3, and a fourth capacitor C4. A first end of the first switch S1 is coupled to the ground end, a first end of the second switch S2 is coupled to the voltage output end, a second end of the first switch S1 is coupled to a first end of the third capacitor C3, and a second end of the second switch S2 is coupled to the first end of the third capacitor C3. A first end of the third switch S3 is coupled to the ground end, a first end of the fourth switch S4 is coupled to a second end of the first capacitor C1, a second end of the third switch S3 is coupled to a first end of the fourth capacitor C4, a second end of the fourth switch S4 is coupled to the first end of the fourth capacitor C4. A second end of the third capacitor C3 is coupled to a first end of the fifth switch S5, a second end of the fifth switch S5 is coupled to the voltage output end, a second end of the fourth capacitor C4 is coupled to a first end of the sixth switch S6, a second end of the sixth switch S6 is coupled to the first end of the fifth switch S5, a first end of the seventh switch S7 is coupled to the voltage input end, and a second end of the seventh switch S7 is coupled to the second end of the fourth capacitor C4. A first end of the first capacitor C1 is coupled to the voltage input end, the second end of the first capacitor C1 is coupled to a first end of the second capacitor C2, and a second end of the second capacitor C2 is coupled to the ground end. When the first switch S1, the fourth switch S4, the fifth switch S5, and the seventh switch S7 are turned on, and the second switch S2, the third switch S3, and the sixth switch S6 are turned off, the third capacitor C3 discharges energy, and the fourth capacitor C4 stores energy. When the first switch S1, the fourth switch S4, the fifth switch S5, and the seventh switch S7 are turned off, and the second switch S2, the third switch S3, and the sixth switch S6 are turned on, the third capacitor C3 stores energy, and the fourth capacitor C4 discharges energy.

Referring to FIG. 3, the DC-DC converter implements voltage conversion in which the input voltage Vin at the voltage input end is converted to the output voltage Vout at the voltage output end. The DC-DC converter provided in this embodiment is applied to a scenario in which a duty cycle of output-input conversion is less than 50%. A working principle is as follows: The SC circuit is a 2:1 SC circuit, and the 2:1 SC circuit includes the first switch S1, the second switch S2, the third switch S3, the fifth switch S5, the sixth switch S6, and the third capacitor C3. The inductor circuit works in a closed-loop mode, and the SC circuit works in an open-loop mode. Input voltage of the SC circuit and that of the inductor circuit are connected in series to the voltage input end, and voltage output ends of the SC circuit and the inductor circuit both are coupled to the voltage output end. In a working period ϕ, the first switch S1, the fourth switch S4, the fifth switch S5, and the seventh switch S7 are turned on, and the second switch S2, the third switch S3, and the sixth switch S6 are turned off. In this case, a charge on the first capacitor C1 is directly discharged to the fourth capacitor C4, the fourth capacitor C4 is in a charging state, the third capacitor C3 discharges energy to the voltage output end, and the third capacitor C3 discharges. In a working period $\bar{\phi}$, the first switch S1, the fourth switch S4, the fifth switch S5, and the seventh switch S7 are turned off, and the second switch S2, the third switch S3, and the sixth switch S6 are turned on. In this case, the third capacitor C3 and the fourth capacitor C4 are connected in series and are coupled to the voltage output end, energy of the fourth capacitor C4 is directly discharged to the voltage output end by using the third capacitor C3, the fourth capacitor C4 discharges energy, and the third capacitor C3 stores energy.

In this embodiment of this application, the SC circuit is implemented by using a 2:1 SC circuit, and the DC-DC converter is further obtained based on the SC circuit and the inductor circuit, so as to implement a DC-DC converter that improves transient performance while improving voltage conversion efficiency.

Referring to FIG. 3 again, the inductor circuit includes an eighth switch S8, a ninth switch S9, and an inductor L. A first end of the eighth switch S8 is coupled to the first end of the second capacitor C2, a second end of the eighth switch S8 is coupled to a first end of the ninth switch S9, a second end of the ninth switch S9 is coupled to the ground end, a first end of the inductor L is coupled to the first end of the ninth switch S9, and a second end of the inductor L is coupled to the voltage output end. Vmid is an input power supply of the inductor circuit, and the eighth switch S8 and the ninth switch S9 are alternately turned on or turned off. The eighth switch S8 and the ninth switch S9 are independent of statuses of the first switch S1, the second switch S2, the third switch S3, the fourth switch S4, the fifth switch S5, the sixth switch S6, and the seventh switch S7.

In a working process of the DC-DC converter, based on the inductor circuit, when the output voltage Vout at the voltage output end is lower than the target voltage, the inductor circuit begins to perform adjustment to prolong on duration of the eighth switch S8 and shorten on duration of the ninth switch S9, so that a current drawn from the voltage end Vmid becomes larger. After the current is drawn, the voltage Vmid is decreased, and in this case, the input voltage V1 of the SC circuit is increased. In addition, because the SC circuit works in an open-loop state, the SC circuit provides energy to the voltage output end, thereby increasing the output voltage at the voltage output end. On the contrary, when the output voltage Vout at the voltage output end is higher than the target voltage, the inductor circuit performs reverse adjustment, that is, shortens the on duration of the eighth switch S8 and prolongs the on duration of the ninth switch S9, so that a current drawn from the voltage output end becomes smaller. After the current is drawn, the voltage Vmid is increased, and voltage between the two ends of the first capacitor C1 is decreased, and the output voltage Vout at the voltage output end is decreased. Finally, when the DC-DC converter reaches a stable state, the voltage V1 between the two ends of the first capacitor C1 meets V1=2×Vout, and voltage V2 between the two ends of the second capacitor C2 meets V2=Vin−2×Vout, thereby ensuring stable working of the entire DC-DC converter.

Voltage conversion efficiency of the DC-DC converter shown in FIG. 3 is better than voltage conversion efficiency of a conventional DC-DC converter, because the SC circuit works in an open-loop mode, and there is no magnetic loss of an inductor of a conventional DC-DC converter implemented by using the inductor and no switch overlapping loss of a power tube. For the DC-DC converter implemented by using the 2:1 SC circuit and the inductor circuit, efficiency of conversion from V1 to Vout can easily be over 90%, or even may be over 95%. It is assumed that conversion efficiency of the SC circuit is $\varphi_{SC}$. For the inductor circuit, a proportion of conversion in which the input voltage is decreased from Vin to V2 is much smaller. Compared with a conventional DC-DC converter implemented by using an inductor, the inductor circuit in this embodiment of this application has a lower magnetic loss. In addition, switch losses of the eighth switch S8 and the ninth switch S9 in this embodiment of this application are lower than those of a PMOS and an NMOS in the conventional DC-DC converter implemented by using an inductor. Moreover, the eighth switch S8 and the ninth switch S9 may be switch tubes with a low withstand voltage. A figure of merit (figure of merit, FOM) value is smaller, and a related loss also becomes smaller. The inductor circuit including the eighth switch S8, the ninth switch S9, and the inductor L implements voltage conversion from V2 to the output voltage Vout. Compared with voltage conversion directly from the input voltage Vin to the output voltage Vout, a value of Vout/V1 is greater than a value of Vout/Vin, and therefore voltage conversion efficiency is high. Assuming that conversion efficiency of the inductor circuit is $\varphi_{bk}$, conversion efficiency of the DC-DC converter is $$\frac{\varphi_{SC} \times V1 + \varphi_{bk} \times V2}{V1 + V2}.$$

Because both $\varphi_{SC}$ and $\varphi_{bk}$ are higher than efficiency of conventional conversion from Vin to Vout, the DC-DC converter has high voltage conversion efficiency.

In this embodiment of this application, the output voltage at the voltage output end of the DC-DC converter is adjusted by using the inductor circuit, so as to implement a DC-DC converter that improves transient performance while improving voltage conversion efficiency.

How the inductor circuit adjusts the output voltage at the voltage output end in the foregoing embodiment is described below in detail. In a feasible implementation, when the output voltage at the voltage output end is lower than the target voltage, the on duration of the eighth switch is prolonged, so that the SC circuit reaches a stable state. When the output voltage at the voltage output end is higher than the target voltage, the on duration of the ninth switch is prolonged, so that the SC circuit reaches a stable state. When the SC circuit reaches a stable state, the voltage between the two ends of the first capacitor is twice the output voltage at the voltage output end, and the voltage between the two ends of the second capacitor is a difference between the input voltage and the voltage between the two ends of the first capacitor.

Still referring to FIG. 3, the eighth switch S8 and the ninth switch S9 are alternately turned on or turned off. When the output voltage at the voltage output end is lower than the target voltage, the on duration of the eighth switch S8 is prolonged, and the on duration of the ninth switch S9 is shortened, so that the SC circuit reaches a stable state. When the output voltage at the voltage output end is higher than the target voltage, the on duration of the ninth switch S9 is prolonged, and the on duration of the eighth switch S8 is shortened, so that the SC circuit reaches a stable state. For example, it is assumed that duration of a period (including working periods $\phi$ and $\bar{\phi}$) is 10 seconds. In an idle state, duration in which the eighth switch S8 is turned on and the ninth switch S9 is turned off is 5 seconds, and duration in which the eighth switch S8 is turned off and the ninth switch S9 is turned on is 5 seconds. When the output voltage at the voltage output end is lower than the target voltage, the on duration of the eighth switch S8 is prolonged to 7 seconds, and the on duration of the ninth switch S9 is shortened to 3 seconds. In this case, because the on duration of the eighth switch S8 is prolonged, energy provided by the inductor circuit to the voltage output end is also increased. Therefore, the output voltage at the voltage output end can be increased. In addition, the current drawn from Vmid is also increased, the voltage at Vmid is decreased, and the voltage between the two ends of the first capacitor C1 is increased, so that the input voltage of the SC circuit is increased, and the output voltage at the SC circuit is inevitably increased. It may be learned from this that both the output voltage of the SC circuit and the output voltage of the inductor circuit are increased. In addition, the output ends of the SC circuit and the inductor circuit both are coupled to the voltage output end, and therefore the output voltage at the voltage output end is inevitably increased. When the output voltage at the voltage output end is higher than the target voltage, the on duration of the eighth switch S8 is shortened to 4 seconds, and the on duration of the ninth switch S9 is prolonged to 6 seconds. In this case, during the on period of the ninth switch S9, because the on duration of the eighth switch S8 is shortened and the on duration of the ninth switch S9 is prolonged, energy provided by the inductor circuit to the voltage output end is decreased. Therefore, the output voltage at the voltage output end can be decreased. In addition, the current drawn from Vmid is decreased, the voltage at Vmid is increased, and the voltage between the two ends of the first capacitor C1 is decreased, so that the input voltage of the SC circuit is decreased, and the output voltage of the SC circuit is inevitably decreased. It may be learned from this that both the output voltage of the SC circuit and the output voltage of the inductor circuit are decreased. In addition, the output ends of the SC circuit and the inductor circuit both are coupled to the voltage output end, and therefore the output voltage at the voltage output end is inevitably decreased.

According to the DC-DC converter provided in this embodiment of this application, the on duration of the eighth switch and that of the ninth switch in the inductor circuit are adjusted, so as to adjust the output voltage at the voltage output end of the DC-DC converter.

Figure 4:
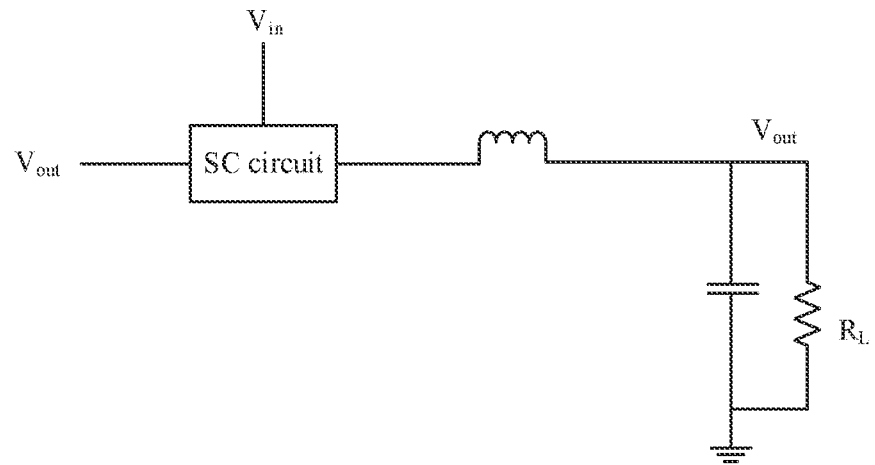
FIG. 4 is a structural diagram of still another DC-DC converter according to an embodiment of this application.

FIG. 4 is a structural diagram of still another DC-DC converter according to an embodiment of this application. Referring to FIG. 4, the DC-DC converter is configured to receive input voltage from a voltage input end, and output voltage to a voltage output end. The DC-DC converter includes a switched capacitor SC circuit and an inductor. An input end of the SC circuit is coupled to the voltage input end. Output ends of the SC circuit include a first output end and a second output end. The first output end is coupled to the voltage output end, the second output end is coupled to one end of the inductor, and the other end of the inductor is coupled to an output end. A capacitor included in the SC circuit is selectively adjusted to be connected in parallel or in series to the inductor.

In this embodiment, when the DC-DC converter works, and the SC circuit is in an energy storage state or an energy discharging state, the SC circuit and the inductor are connected in parallel. When the SC circuit and the inductor are connected in parallel, because the SC circuit is configured to improve voltage conversion efficiency, and the inductor is configured to improve transient performance, conversion efficiency of the DC-DC converter is equal to the sum of conversion efficiency of the SC circuit and conversion efficiency of the inductor, instead of conversion efficiency of a conventional hybrid DC-DC converter that is equal to a product of the conversion efficiency of the SC circuit and the conversion efficiency of the inductor. Therefore, the DC-DC converter provided in this embodiment of this application can improve voltage conversion efficiency.

The DC-DC converter in FIG. 4 is described below in detail by using two examples. For example, reference may be made to FIG. 5 and FIG. 6.

Figure 5:
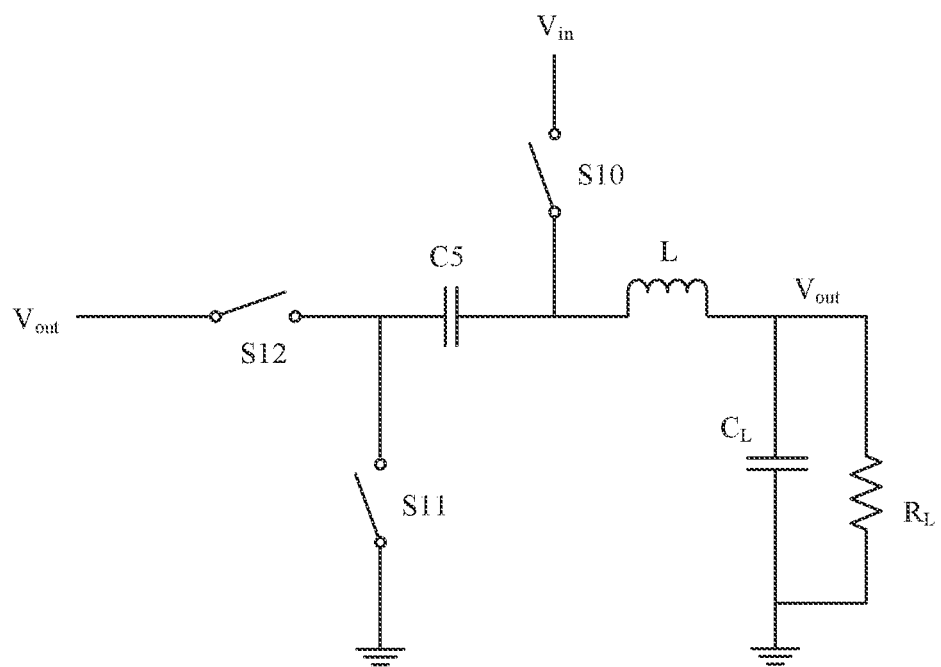
FIG. 5 is a structural diagram of still another DC-DC converter according to an embodiment of this application.

FIG. 5 is a structural diagram of still another DC-DC converter according to an embodiment of this application. Referring to FIG. 5, in the DC-DC converter, the capacitor included in the SC circuit is a fifth capacitor C5, and the SC circuit further includes a tenth switch S10, an eleventh switch S11, and a twelfth switch S12. A first end of the tenth switch S10 is coupled to the voltage input end, a second end of the tenth switch S10 is coupled to a first end of the fifth capacitor C5, a second end of the fifth capacitor C5 is coupled to a first end of the eleventh switch S11, a second end of the eleventh switch S11 is coupled to a ground end, the first end of the eleventh switch S11 is coupled to a first end of the twelfth switch S12, a second end of the twelfth switch S12 is coupled to the voltage output end, the first end of the fifth capacitor C5 is coupled to a first end of the inductor L, and a second end of the inductor L is coupled to the voltage output end. The voltage output end is connected to a load capacitor $C_L$, a load resistor $R_L$, or the like.

As shown in FIG. 5, in this embodiment, the SC circuit included in the DC-DC converter is an open-loop SC architecture, and a buck circuit including the inductor L works in a closed-loop mode. The DC-DC converter provided in this embodiment is applied to a scenario in which a duty cycle of output-input conversion is greater than 50%. A working principle is as follows: When the tenth switch S10 and the twelfth switch S12 are turned on, and the eleventh switch S11 is turned off, in one aspect, the voltage input end provides energy to the voltage output end by using the inductor L, and a current direction is from the voltage input end to the inductor L and then to the voltage output end. In another aspect, the voltage input end charges the fifth capacitor C5 while providing energy to the voltage output end by using the fifth capacitor C5, and a current direction is from the voltage input end to the fifth capacitor C5 and then to the voltage output end. In a stable state, the fifth capacitor C5 is in a charging state, and voltage Vc between the two ends of the fifth capacitor meets Vc=Vin-Vout. When the tenth switch S10 and the twelfth switch S12 are turned off, and the eleventh switch S11 is turned on, the fifth capacitor C5 and the inductor L are connected in series, the fifth capacitor C5 provides energy to the inductor L, a current direction is from the fifth capacitor C5 to the inductor L and then to the voltage output end, and the fifth capacitor is in a discharging state. In a working process of the DC-DC converter, because the SC circuit works in an open-loop state and there is no magnetic loss of an inductor, voltage conversion efficiency is higher than that of a buck converter implemented by using an inductor.

According to the DC-DC converter provided in this embodiment of this application, the SC circuit is an open-loop SC architecture, a switch voltage drop of the SC circuit is smaller than that of a power supply, and conversion efficiency of the entire SC is relatively high. In addition, the SC works in an open-loop state, and voltage drops at the two ends of the inductor L are relatively small, so that a magnetic loss of the inductor L is relatively small. Therefore, conversion efficiency of the DC-DC converter is relatively high overall.

Flow the output voltage at the voltage output end is adjusted in the embodiment in FIG. 5 is described below in detail. In a feasible implementation, when the output voltage Vout at the voltage output end is lower than target voltage, on duration of the tenth switch S10 and on duration of the twelfth switch S12 are prolonged, so that the voltage input end provides energy to the output end by using the fifth capacitor C5 to increase the output voltage at the voltage output end, and the SC circuit reaches a stable state. When the output voltage Vout at the voltage output end is higher than the target voltage, on duration of the eleventh switch S11 is prolonged. In this case, the tenth switch S10 and the twelfth switch S12 are in an open state, which is equivalent to that the input voltage at the voltage input end is turned off and that only the fifth capacitor C5 provides energy to the voltage output end by using the inductor L. Therefore, the output voltage at the voltage output end can be decreased, and the SC circuit reaches a stable state. When the SC circuit reaches a stable state, voltage between the two ends of the fifth capacitor C5 is the same as the output voltage at the voltage output end.

According to the DC-DC converter provided in this embodiment of this application, the on duration of the switch in the DCDC circuit is adjusted, so as to adjust the output voltage at the voltage output end of the DC-DC converter.

It should be noted that although in the circuit shown in FIG. 5, the SC circuit includes the tenth switch S10, the eleventh switch S11, the twelfth switch S12, and the fifth capacitor C5, the SC circuit may further include another switch. The switch is disposed between the tenth switch S10 and the inductor L, that is, between the fifth capacitor C5 and the inductor L. However, the switch may be omitted due to existence of the inductor L, so that the SC circuit includes only the tenth switch S10, the eleventh switch S11, the twelfth switch S12, and the fifth capacitor C5.

Figure 6:
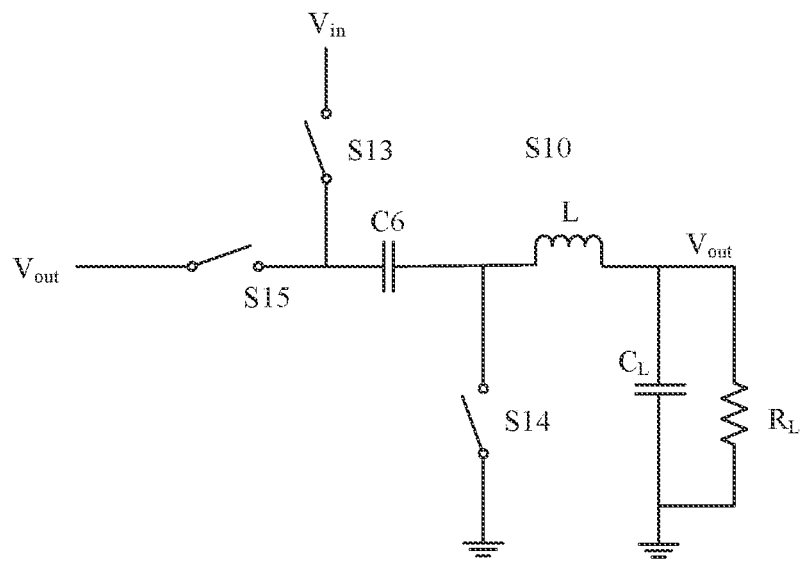
FIG. 6 is a structural diagram of still another DC-DC converter according to an embodiment of this application.

FIG. 6 is a structural diagram of still another DC-DC converter according to an embodiment of this application. Referring to FIG. 6, in the DC-DC converter, the capacitor included in the SC circuit is a sixth capacitor, and the SC circuit further includes a thirteenth switch S13, a fourteenth switch S14, and a fifteenth switch S15. A first end of the thirteenth switch S13 is coupled to the voltage output end, a second end of the thirteenth switch S13 is coupled to a first end of the sixth capacitor C6, a second end of the sixth capacitor C6 is coupled to a first end of the fourteenth switch S14, a second end of the fourteenth switch S14 is coupled to a ground end, the first end of the sixth capacitor C6 is coupled to a first end of the fifteenth switch S15, a second end of the fifteenth switch S15 is coupled to an output end, the second end of the sixth capacitor C6 is coupled to a first end of the inductor L, and a second end of the inductor L is coupled to the voltage output end. The voltage output end is connected to a load capacitor CL, a load resistor RL, or the like.

As shown in FIG. 6, in this embodiment, the SC circuit included in the DC-DC converter is an open-loop SC architecture. The DC-DC converter provided in this embodiment is applied to a scenario in which a duty cycle of output-input conversion is less than 50%. A working principle is as follows: When the thirteenth switch S13 is turned on, and the fourteenth switch S14 and the fifteenth switch S15 are turned off, the voltage input end provides energy to the voltage output end by using the sixth capacitor C6 and the inductor L. In this case, the sixth capacitor C6 is in a charging state, and a current flows from the voltage input end to the voltage output end through the thirteenth switch S13, the sixth capacitor C6, and the inductor L. When the thirteenth switch S13 is turned off, and the fourteenth switch S14 and the fifteenth switch S15 are turned on, in one aspect, the inductor L provides energy to the voltage output end. In another aspect, the sixth capacitor C6 provides energy to the voltage output end by using the fifteenth switch S15, and the sixth capacitor C6 is in a discharging state. When the DC-DC converter reaches a stable state, voltage Vc between the two ends of the sixth capacitor C6 meets Vc=Vout. In a working process of the DC-DC converter, because the SC circuit works in an open-loop mode, a switch voltage drop of the SC circuit is smaller than that of a power supply, and conversion efficiency of the entire SC is relatively high. In addition, the SC works in an open-loop state, and voltage drops at the two ends of the inductor L are relatively small, so that a magnetic loss of the inductor L is relatively small. Therefore, conversion efficiency of the DC-DC converter is relatively high overall.

It may be learned based on the working principle in FIG. 6 that, in the working process of the DC-DC converter shown in FIG. 6, when the SC circuit is in an energy storage state, the sixth capacitor C6 in the SC circuit and the inductor L are in series connection. When the SC circuit is in a discharging state, the sixth capacitor C6 in the SC circuit and the inductor L are in parallel connection. The SC circuit is configured to improve voltage conversion efficiency, and may be referred to as a high-efficiency module. The inductor is configured to improve transient performance, and may be referred to as a high-performance module. Therefore, when the SC circuit is in an energy discharging state, the high-transient module and the high-efficiency module are in parallel connection. For example, referring to FIG. 7, FIG. 7 is a schematic diagram of a relationship between a high-transient module and a high-efficiency module when the SC circuit in FIG. 6 is in an energy discharging state.

Figure 7:
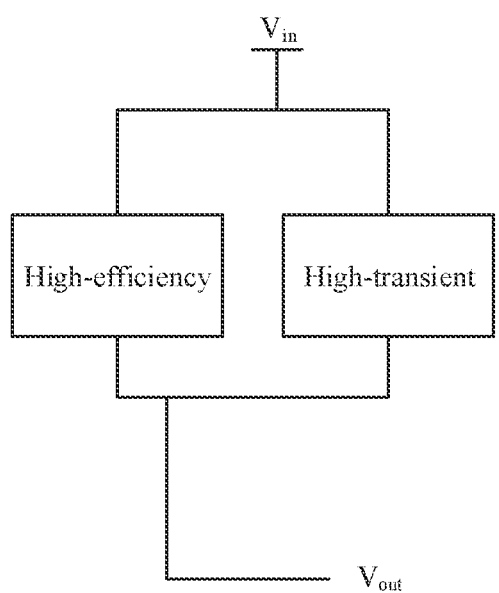
FIG. 7 is a schematic diagram of a relationship between a high-transient module and a high-efficiency module when the SC circuit in FIG. 6 is in an energy discharging state.

Referring to FIG. 7, when the SC circuit is in an energy discharging state, the high-transient module and the high-efficiency module are in parallel connection. In this case, there is only a one-stage circuit from the voltage input end to the voltage output end, and conversion efficiency is an additive relationship. To be specific, conversion efficiency of the DC-DC converter is the sum of conversion efficiency of the SC circuit and conversion efficiency of a buck circuit formed by using the inductor, instead of conversion efficiency of a conventional hybrid DC-DC converter that is equal to a product of the conversion efficiency of the SC circuit and the conversion efficiency of the inductor. Therefore, the DC-DC converter provided in this embodiment of this application can improve voltage conversion efficiency. In addition, during transient transition, because energy is provided to the voltage output end from two paths in parallel, transient energy supplement is much better than that in a series connection solution. Therefore, the DC-DC converter provided in this embodiment of this application can improve transient performance while improving voltage conversion efficiency.

It should be noted that although in the circuit shown in FIG. 6, the SC circuit includes the thirteenth switch S13, the fourteenth switch S14, the fifteenth switch S15, and the sixth capacitor C6, the SC circuit may further include another switch. The switch is disposed between the fourteenth switch S14 and the inductor L, that is, between the sixth capacitor C6 and the inductor L. However, the switch may be omitted due to existence of the inductor L, so that the SC circuit includes only the thirteenth switch S13, the fourteenth switch S14, the fifteenth switch S15, and the sixth capacitor C6.

What is claimed is:

1. A direct current-direct current (DC-DC) converter, configured to receive input voltage from a voltage input end and output voltage to a voltage output end, wherein:
   the DC-DC converter comprises a first capacitor, a second capacitor, a switched capacitor (SC) circuit, and an inductor circuit;
   an input end of the SC circuit is coupled to the voltage input end, and an output end of the SC circuit is coupled to the voltage output end; and
   the first capacitor and the second capacitor are sequentially connected in series between the voltage input end and a ground end, one end of the inductor circuit is selectively coupled between the first capacitor and the second capacitor or to the ground end, and the other end of the inductor circuit is coupled to the voltage output end.

2. The DC-DC converter according to claim 1, wherein:
   the SC circuit comprises a third capacitor and a fourth capacitor;
   one end of the third capacitor is selectively coupled to the voltage input end or the voltage output end, and the other end of the third capacitor is selectively coupled to the voltage output end or the ground end; and
   one end of the fourth capacitor is selectively coupled to the voltage input end or the voltage output end, and the other end of the fourth capacitor is selectively coupled between the first capacitor and the second capacitor or to the ground end.

3. The DC-DC converter according to claim 2, wherein the SC circuit further comprises a first switch, a second switch, a third switch, a fourth switch, a fifth switch, a sixth switch, and a seventh switch, wherein:
   a first end of the first switch is coupled to the ground end, a first end of the second switch is coupled to the voltage output end, a second end of the first switch is coupled to a first end of the third capacitor, and a second end of the second switch is coupled to the first end of the third capacitor;
   a first end of the third switch is coupled to the ground end, a first end of the fourth switch is coupled to a second end of the first capacitor, a second end of the third switch is coupled to a first end of the fourth capacitor, and a second end of the fourth switch is coupled to the first end of the fourth capacitor;
   a second end of the third capacitor is coupled to a first end of the fifth switch, a second end of the fifth switch is coupled to the voltage output end, a second end of the fourth capacitor is coupled to a first end of the sixth switch, and a second end of the sixth switch is coupled to the first end of the fifth switch;
   a first end of the seventh switch is coupled to the voltage input end, and a second end of the seventh switch is coupled to the second end of the fourth capacitor; and
   a first end of the first capacitor is coupled to the voltage input end, the second end of the first capacitor is coupled to a first end of the second capacitor, and a second end of the second capacitor is coupled to the ground end; and
   when the first switch, the fourth switch, the fifth switch, and the seventh switch are turned on, and the second switch, the third switch, and the sixth switch are turned off, the third capacitor discharges energy, and the fourth capacitor stores energy; and
   when the first switch, the fourth switch, the fifth switch, and the seventh switch are turned off, and the second switch, the third switch, and the sixth switch are turned on, the third capacitor stores energy, and the fourth capacitor discharges energy.

4. The DC-DC converter according to claim 3, wherein the inductor circuit comprises an eighth switch, a ninth switch, and an inductor, wherein:
   a first end of the eighth switch is coupled to the first end of the second capacitor, a second end of the eighth switch is coupled to a first end of the ninth switch, a second end of the ninth switch is coupled to the ground end, a first end of the inductor is coupled to the first end of the ninth switch, and a second end of the inductor is coupled to the voltage output end.

5. The DC-DC converter according to claim 4, wherein:
   when the output voltage at the voltage output end is lower than target voltage, on duration of the eighth switch is prolonged, so that the SC circuit reaches a stable state;
   when the output voltage at the voltage output end is higher than the target voltage, on duration of the ninth switch is prolonged, so that the SC circuit reaches a stable state; and
   when the SC circuit reaches a stable state, voltage between the two ends of the first capacitor is twice the output voltage at the voltage output end, and voltage between the two ends of the second capacitor is a difference between the input voltage and the voltage between the two ends of the first capacitor.

6. A direct current-direct current (DC-DC) converter, configured to receive input voltage from a voltage input end and output voltage to a voltage output end, wherein:
   the DC-DC converter comprises a switched capacitor (SC) circuit and an inductor;
   an input end of the SC circuit is coupled to the voltage input end, and output ends of the SC circuit comprise a first output end and a second output end;
   the first output end is coupled to the voltage output end, the second output end is coupled to one end of the inductor, and the other end of the inductor is coupled to the voltage output end; and
   a capacitor comprised in the SC circuit is selectively adjusted to be connected in parallel or in series to the inductor.

7. The DC-DC converter according to claim 6, wherein:
   the capacitor comprised in the SC circuit is a fifth capacitor; and
   the SC circuit further comprises a tenth switch, an eleventh switch, and a twelfth switch, wherein:
   a first end of the tenth switch is coupled to the voltage input end, a second end of the tenth switch is coupled to a first end of the fifth capacitor, a second end of the fifth capacitor is coupled to a first end of the eleventh switch, a second end of the eleventh switch is coupled to a ground end, the first end of the eleventh switch is coupled to a first end of the twelfth switch, a second end of the twelfth switch is coupled to the voltage output end, the first end of the fifth capacitor is coupled to a first end of the inductor, and a second end of the inductor is coupled to the voltage output end.

8. The DC-DC converter according to claim 7, wherein:
   when the tenth switch and the twelfth switch are turned on, and the eleventh switch is turned off, the SC circuit is in an energy storage state, and the fifth capacitor and the inductor are connected in parallel; and
   when the tenth switch and the twelfth switch are turned off, and the eleventh switch is turned on, the SC circuit is in an energy discharging state, and the fifth capacitor and the inductor are connected in series.

9. The DC-DC converter according to claim 7, wherein:

when the output voltage at the voltage output end is lower than target voltage, on duration of the tenth switch and on duration of the twelfth switch are prolonged, so that the SC circuit reaches a stable state;

when the output voltage at the voltage output end is higher than the target voltage, on duration of the eleventh switch is prolonged, so that the SC circuit reaches a stable state; and when the SC circuit reaches a stable state, voltage between the two ends of the fifth capacitor is the same as the output voltage at the voltage output end.

10. The DC-DC converter according to claim 6, wherein:
the capacitor comprised in the SC circuit is a sixth capacitor; and
the SC circuit further comprises a thirteenth switch, a fourteenth switch, and a fifteenth switch, wherein:
a first end of the thirteenth switch is coupled to the voltage input end, a second end of the thirteenth switch is coupled to a first end of the sixth capacitor, a second end of the sixth capacitor is coupled to a first end of the fourteenth switch, a second end of the fourteenth switch is coupled to a ground end, the first end of the sixth capacitor is coupled to a first end of the fifteenth switch, a second end of the fifteenth switch is coupled to the voltage output end, the second end of the sixth capacitor is coupled to a first end of the inductor, and a second end of the inductor is coupled to the voltage output end.

11. The DC-DC converter according to claim 10, wherein:
when the thirteenth switch is turned on, and the fourteenth switch and the fifteenth switch are turned off, the SC circuit is in an energy storage state, and the sixth capacitor and the inductor are connected in series; and when the thirteenth switch is turned off, and the fourteenth switch and the fifteenth switch are turned on, the SC circuit is in an energy discharging state, and the sixth capacitor and the inductor are connected in parallel.

12. The DC-DC converter according to claim 10, wherein:
when the output voltage at the voltage output end is lower than target voltage, on duration of the thirteenth switch is prolonged, so that the SC circuit reaches a stable state;

when the output voltage at the voltage output end is higher than the target voltage, on duration of the fourteenth switch and on duration of the fifteenth switch are prolonged, so that the SC circuit reaches a stable state; and when the SC circuit reaches a stable state, voltage between the two ends of the sixth capacitor is the same as the output voltage at the voltage output end.

\* \* \* \* \*